United States Patent [19]

Lemanski

[11] 4,165,163

[45] Aug. 21, 1979

[54] CAMERA HAVING MULTIPLE IMAGE DEVICE

[76] Inventor: Savarian F. Lemanski, 109 Taylor Ave., Detroit, Mich. 48202

[21] Appl. No.: 854,627

[22] Filed: Nov. 25, 1977

[51] Int. Cl.² .............................................. G03B 1/00
[52] U.S. Cl. .................................................. 354/122
[58] Field of Search ............... 354/295, 296, 110–125, 354/101, 102

[56] References Cited

U.S. PATENT DOCUMENTS

| | | | |
|---|---|---|---|
| 1,056,588 | 3/1913 | Rusk | 354/122 |
| 1,068,862 | 7/1913 | Digweed | 354/122 |
| 2,437,159 | 3/1948 | Herbert | 354/117 X |
| 4,012,748 | 3/1977 | Lemanski | 354/122 |
| 4,053,910 | 10/1977 | Bodnar | 354/120 |

FOREIGN PATENT DOCUMENTS 151378 9/1920 United Kingdom ..................... 354/295

*Primary Examiner*—Donald A. Griffin
*Attorney, Agent, or Firm*—Charles W. Chandler

[57] ABSTRACT

A pair of masks are mounted in front of a camera lens, one mask adjacent the lens and the other an adjustable distance in front of the first mask. The masks permit light to be transmitted through only a predetermined portion of the lens during each exposure so that only a corresponding portion of the film frame is exposed. The distance between the outer mask and the lens is adjusted according to the focused position of the lens when a zoom lens is employed to obviate overlapping of adjacent images on the film. The mask adjacent the lens opening is used with a conventional lens for forming four exposures in different areas of a single film frame.

5 Claims, 10 Drawing Figures

CAMERA HAVING MULTIPLE IMAGE DEVICE

BACKGROUND OF THE INVENTION

This invention is related to the production of multiple image photographs and comprises an improvement over the device disclosed in my U.S. Pat. No. 4,012,748 which issued Mar. 15, 1977, for a "Camera Device for Obtaining a Split Image".

A problem with multiple image attachments of the prior art is that they are difficult to use with a wide angle zoom lens without the images overlapping on the film.

SUMMARY OF THE INVENTION

The broad purpose of the present invention is to provide a multiple image attachment for a camera comprising an elongated tubular structure having a pair of semi-circular masks. The inner mask is mounted adjacent the lens opening, and the outer mask is mounted an adjusted distance forward of the inner mask. The inner mask comprises a pair of closely spaced planar semi-circular mask members which can be rotated by the user to expose either one half of the film frame or a quarter of the film frame. The mask is then rotated to expose another portion of the same film frame.

The outer mask can be moved to an adjusted distance from the lens to accomodate a wide-angle zoom lens. The outer mask can also be rotated to expose selected portions of a film frame.

Still other advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
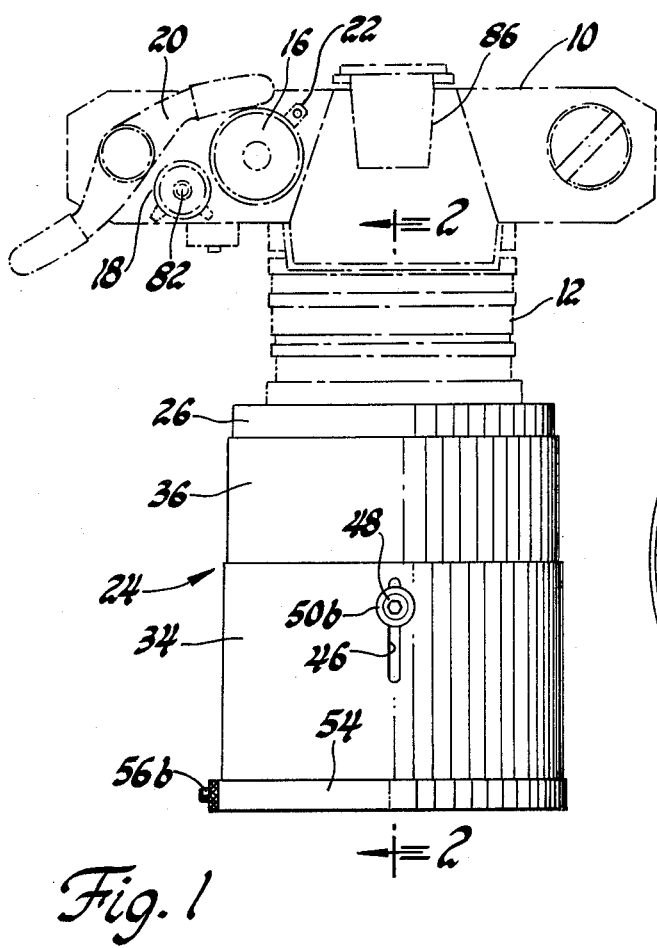
FIG. 1 is a plan view of a camera having a multiple image attachment illustrating the preferred embodiment of the invention.
Figure 2:
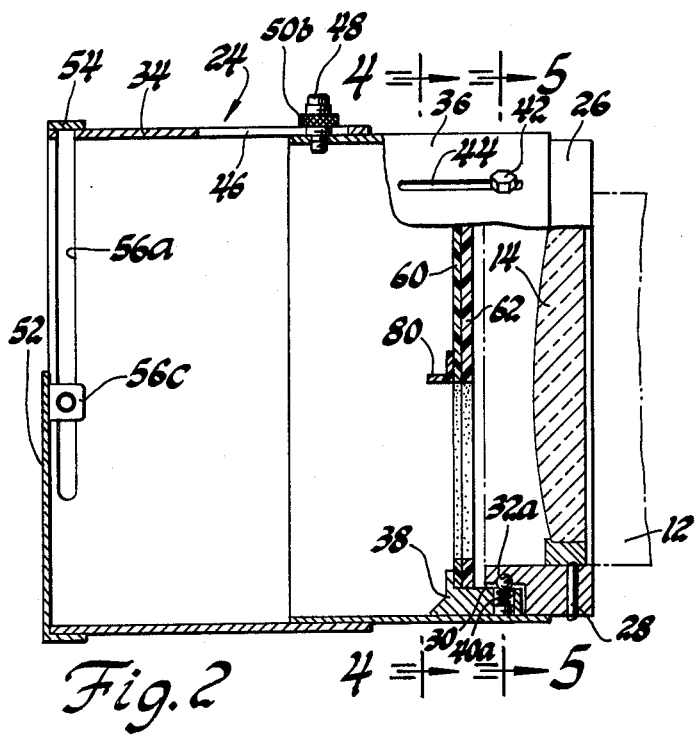
FIG. 2 is an enlarged fragmentary view taken along lines 2—2 of FIG. 1.

Referring to the drawings, FIGS. 1 and 2 illustrate a 35 mm camera 10 having a forwardly projecting generally cylindrical lens housing 12 supporting a wide angle zoom lens 14. For purposes of illustration, camera 10 is a Japanese produced Konica Autoreflex T3. This camera has a dial 16, an on/off lever 18, and film control lever 20. After each film exposure, lever 20 is rotated counterclockwise to the alternate position illustrated in phantom to reset the exposure mechanism.

A lever 22, mounted adjacent dial 16 is rotatable in the counterclockwise direction to prevent the film (not shown) from being advanced as the exposure mechanism is being reset. By utilizing this procedure, the user can take several exposures of selected portions of a single film frame.

Figure 5:
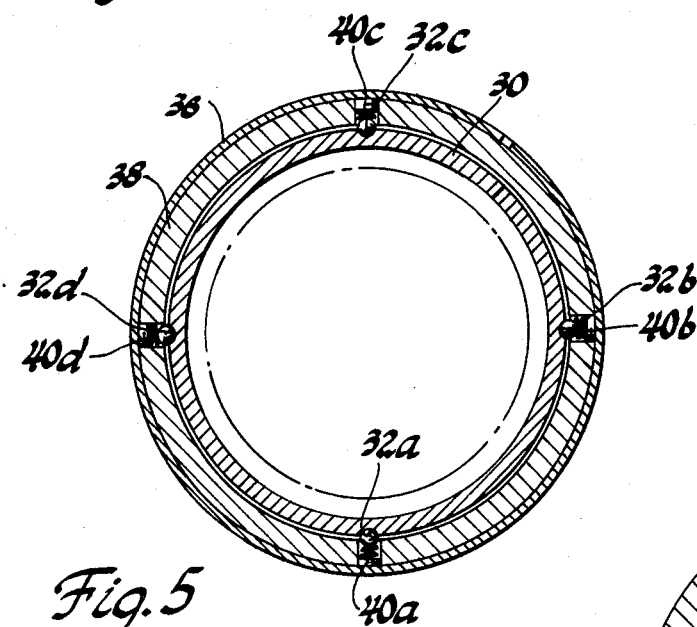
FIG. 5 is a view taken along lines 5—5 of FIG. 2.

Referring to FIGS. 2 and 5, a multiple image attachment, illustrated at 24, is mounted on lens housing 12. Attachment 24 comprises a mounting ring 26 attached by fastener screws 28 to housing 12. Mounting ring 26 has an annular shoulder 30 and four equi-annularly spaced semi-hemispherical seats 32a, 32b, 32c, and 32d.

A pair of telescopically engaged tubes 34 and 36 are carried on ring 26 by means of a second mounting ring 38 carried within tube 36.

Ring 38 is longitudinally slidably movable within tube 36. Ring 38 has four spring loaded ball detent means 40a, 40b, 40c, and 40d mounted in equi-annularly spaced positions on the inner side of the ring to mate with seats 32a, 32b, 32c, and 32d.

Ring 38 can be readily adjusted on ring 26 by rotating tube 36 to any of four different positions 90° apart. A hexagonal headed screw 42, carried by ring 38, is slidably mounted in a slot 44 formed in tube 36 to permit ring 38 to be moved longitudinally within tube 36, but to prevent rotation of the ring within the tube.

Figure 10:
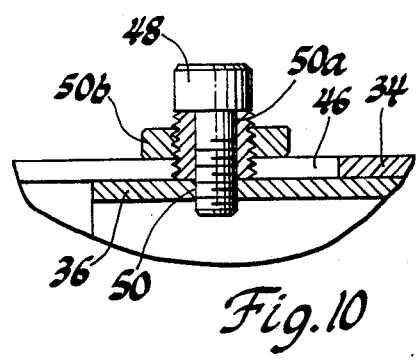
FIG. 10 is an enlarged sectional view of the fastener means for locking the mask supporting tubes together.

Referring to FIGS. 1 and 10, tube 34 has a longitudinal slot 46. A hex head screw 48 is received through slot 46 and into a tapped opening 50 in tube 36. An externally threaded sleeve 50a is mounted between the head of screw 48 and tube 36. A knurled nut 50b is mounted on sleeve 50a. To lock tube 34 in a fixed position with respect to tube 36, the user rotates screw 48 toward tube 36 until the head of screw 48 clamps sleeve 50a between the head of the screw and tube 36. He then rotates nut 50b down until it engages tube 34 to clamp it between the nut and tube 36. To slidably move tube 34 with respect to tube 36, the user backs off nut 50b, rearranges the tubes with respect to one another, and then tightens nut 50b.

Figure 3:
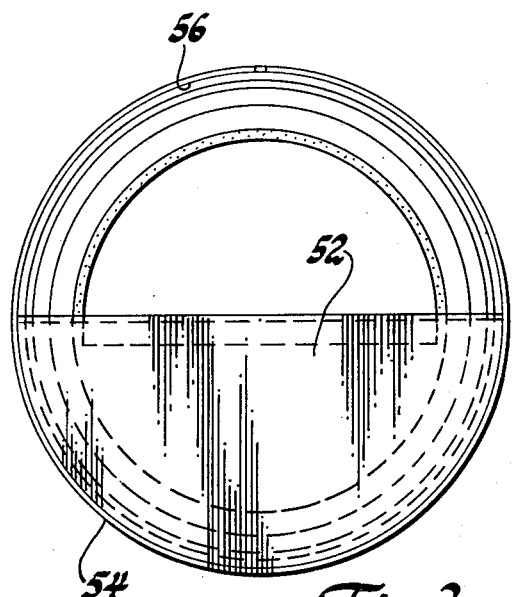
FIG. 3 is an enlarged view as seen from the bottom of FIG. 1.

Referring to FIGS. 2 and 3, an outer mask 52 is carried by a ring 54 so as to be slidably rotatably mounted on the outer end of tube 34 to define a semi-circular opening 56 for the transmission of light to lens 14. A slot 56a is formed in an arc of about 90° adjacent the outer end of tube 34 and receives a threaded fastener 56b which is connected to a nut 56c to lock ring 54 to tube 34. Mask 52 can be rotatably adjusted with respect to the lens in either of two ways: by rotating tube 34 with respect to tube 36 in order to redefine the opening through which light is passed through lens 14, and by adjusting mask 52 with respect to tube 34 in order to compensate for adjustments made necessary in focusing lens 14.

Figure 4:
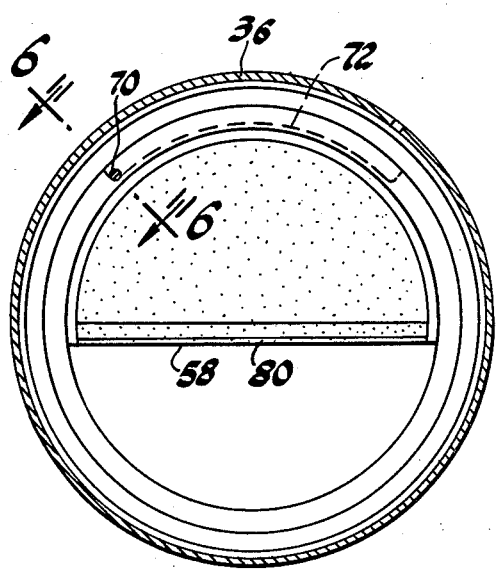
FIG. 4 is a view taken along lines 4—4 of FIG. 2.
Figure 6:
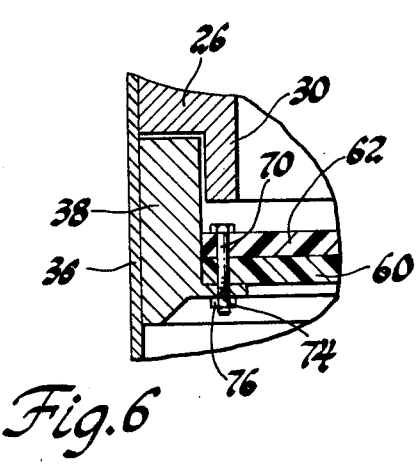
FIG. 6 is an enlarged view taken along lines 6—6 of FIG. 4.

Referring to FIG. 4, an inner mask means, generally indicated at 58, is mounted within ring 38 adjacent camera lens 14. Mask means 58 includes two planar mask members 60 and 62, illustrated in FIGS. 7 and 8. Mask member 62 is preferably formed of a thin, plastic material, and has a semi-circular opening 64. Referring to FIG. 6, a fastener 70 is received through an opening 68 in mask 62, a slot 72 in mask 60, an opening 74 in ring 38, and is connected to a nut 76 to lock mask member 62 to ring 38. Thus mask member 62 is rotatable with ring 38.

Figure 7:
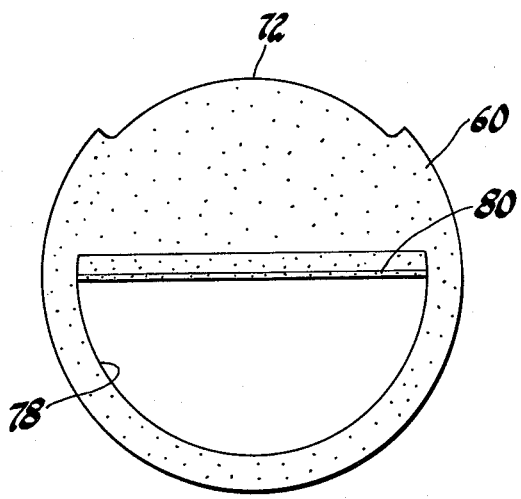
FIG. 7 is a view of one of the inner mask members.
Figure 8:
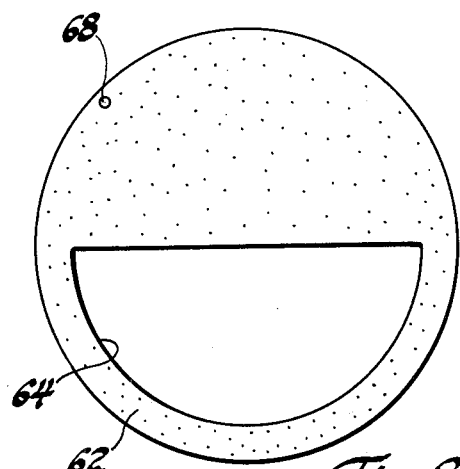
FIG. 8 is a view of the other inner mask member.

Referring to FIGS. 6 and 7, slot 72 is formed through an arc of about 90° with respect to the center of mask member 60 so that it can be rotated with respect to mask member 62. Mask member 60 also has a semi-circular opening 78 identical in size to opening 64. A handle 80 is mounted on mask member 60 adjacent opening 78 to permit the user to rotate mask 60 between adjusted positions.

The preferred attachment can be used for most camera lens. For a general purpose lens, tube 34 with outer mask 52 is separated from tube 36 leaving only mask means 58 adjacent lens 14. The user decides whether he wants to make two or four exposures per film. To make two exposures, he manipulates mask 60 such that opening 78 is aligned with opening 64. In this position, the two masks cooperate to permit light to be transmitted through the lens to only one-half of the image-producing surface of the camera film. The user then exposes the film in the conventional manner by depressing shutter-actuating button 82. He then rotates tube 36 180° so that openings 78 and 64 permit light to be transmitted through the other half of the lens to the film. He then takes a second exposure to provide two images on the same film frame.

If the user wants to make four images per film frame, he rotates mask 60, 90° so that it blocks off half of opening 64 thereby forming a pie-shaped opening. He exposes the first image and the initial exposure in the usual manner, rotates tube 36 about mounting ring 26 a quarter turn until the detents register in the next position, exposes the second image, rotates tube 36 another quarter turn to take the third image and then rotates the tube another quarter turn to take the fourth image. The user then has a film frame in which different exposures are formed in the four corners of a single frame.

Figure 9:
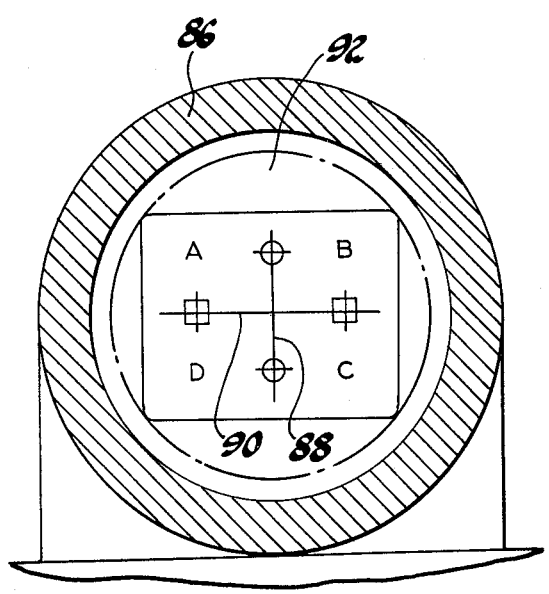
FIG. 9 is a view of the camera view finder.

In order to assist the user in aligning the images, a view finder 86 is mounted on top of the camera housing, as illustrated in FIGS. 1 and 9. View finder 86 has an internal view-finding lens 92 provided with a pair of cross hairs 88 which divide lens 92 into four quarters labeled A, B, C, and D, respectively. The user employs the view-finding lens to frame the images that he is forming on the film by aligning each quartile of the lens with the image corresponding with the opening defined by the masks.

When the user is employing a wide angle zoom lens, he mounts outer mask 52 on the camera. The user releases nut 50b sufficiently to adjust the distance between mask 52 and lens 14 to eliminate any halo about the image of the object being photographed. The distance between mask 52 and lens 14 depends upon the focusing of the image and can be quickly adjusted by one skilled in the art of using such a camera. By employing the outer mask, the user can eliminate any significant overlapping of the images when using a zoom lens.

The preferred attachment can be used for a regular tele-photo lens.

It is unnecessary to employ the inner mask when a wide angle zoom lens is being used. When the user is employing a zoom lens for an object that is being photographed relatively close to the camera, the user can remove the inner mask. For objects a relatively long distance away from the camera, it is unnecessary to remove the inner mask.

Having described my invention, I claim:

1. In combination with a camera having a lens for transmitting light to expose film in the camera, a multiple image attachment comprising:
    a housing comprising a first tube and a second tube telescopically received in the first tube for longitudinal motion thereto, said housing having a first opening and a second opening for the transmission of light through said housing;
    means for mounting said housing on the camera in a first position such that said first opening is adjacent the camera lens;
    first mask means mounted in the first tube an adjusted distance with respect to the lens for partially blocking light being received into the housing;
    second mask means mounted in the second tube in a position between the first mask means and the camera lens, the second mask means being cooperable with the first mask means to permit light to be transmitted through only a predetermined portion of the lens;
    the distance between the first mask means and the second mask means being adjustable by adjusting the position of the first tube with respect to the second tube; and
    said mounting means supporting said first mask means and said second mask means for motion toward a second position to permit light to be transmitted to a portion of the lens through which light was blocked in said first mask position.

2. A combination as defined in claim 1, in which the first ring member has an annular shoulder, and the second ring member is rotatably, slidably mounted on said shoulder.

3. A combination as defined in claim 1, including a first ring member mounted adjacent the camera lens, a second ring member carried by one of said tubes, the second ring member being slidably receivable on the first ring member, and including means disposed between the first ring member and the second ring member for releasibly retaining same in a position on the first ring member corresponding to the position of said mask means with respect to the lens.

4. In combination with a camera having a zoom lens having an adjustable focal length for transmitting light to expose film in the camera, a multiple image attachment comprising:
    a housing having a pair of cooperating telescopically engaged members having a first opening and a second opening at opposite ends of the housing;
    means for mounting the housing on the camera in a first position such that the first opening is adjacent the camera lens;
    a pair of mask members mounted at the opposite end of the housing, the mask members being movable with respect to one another between a first relative position in which the two mask members cooperate to form an opening for the transmission of light to a first selected portion of the camera lens, and a second relative position in which the two mask members cooperate to block light to said first selected portion of said lens and permit light to pass to a second selected portion of the lens; and
    means for moving the two mask members in either of said relative positions, from a first adjusted distance to a second adjusted distance with respect to said lens to accomodate the focal length of said lens.

5. A combination as defined in claim 4, in which one of said mask means comprises a first planar member disposed in said housing, the first planar member having a semi-circular opening; a second planar member disposed adjacent the first planar member and having a semi-circular opening, the second planar member being rotatable with respect to the first planar member between a first position in which the semi-circular openings of the two planar members are aligned to form a semi-circular opening for the transmission of light to the camera lens, and a second position in which the two planar members are aligned such that one of the planar members blocks a selected portion of the opening of the other planar member whereby the two planar members cooperate to permit light to pass to only a predetermined portion of the camera lens.

* * * * *